US009002145B2

(12) United States Patent
Sudo et al.

(10) Patent No.: US 9,002,145 B2
(45) Date of Patent: Apr. 7, 2015

(54) OPTICAL FREQUENCY COMB GENERATING DEVICE AND OPTICAL PULSE GENERATING DEVICE USING SAME, AND OPTICAL FREQUENCY COMB GENERATING METHOD AND OPTICAL PULSE GENERATING METHOD USING SAME

(75) Inventors: Masaaki Sudo, Chiyoda-ku (JP); Masahito Mure, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 174 days.

(21) Appl. No.: 13/581,364

(22) PCT Filed: Feb. 21, 2011

(86) PCT No.: PCT/JP2011/053669
§ 371 (c)(1),
(2), (4) Date: Nov. 6, 2012

(87) PCT Pub. No.: WO2011/105324
PCT Pub. Date: Sep. 1, 2011

(65) Prior Publication Data
US 2013/0051723 A1 Feb. 28, 2013

(30) Foreign Application Priority Data

Feb. 26, 2010 (JP) ................................. 2010-041610

(51) Int. Cl.
*G02F 1/035* (2006.01)
*H04B 10/548* (2013.01)
(Continued)

(52) U.S. Cl.
CPC .......... *G02F 1/0123* (2013.01); *H04B 10/5053* (2013.01); *H04B 10/50572* (2013.01);
(Continued)

(58) Field of Classification Search
None
See application file for complete search history.

(56) References Cited

U.S. PATENT DOCUMENTS 6,539,038 B1 * 3/2003 Wilkerson et al. ......... 372/38.02
2003/0202727 A1 * 10/2003 Olesen .............................. 385/1
(Continued)

FOREIGN PATENT DOCUMENTS

| JP | 2007-248660 A | 9/2007 |
| JP | 2008-197639 A | 8/2008 |
| JP | 2009-175576 A | 8/2009 |
| JP | 2009-229926 A | 10/2009 |

OTHER PUBLICATIONS

Sakamoto, T., et al., "Mach-Zehnder-Modulator-Based Flat Comb Generator with Auto Bias Control," Microwave Photonics, 2008, pp. 154-157.

*Primary Examiner* — Hemang Sanghavi
(74) *Attorney, Agent, or Firm* — Taft Stettinius & Hollister LLP (57) ABSTRACT

The optical frequency comb generating device having two optical modulation parts 41 and 42 independently modulating optical waves propagating in two branch waveguides and a phase regulator 43 controlling a phase difference between the optical waves includes amplitude adjusting means 22 for adjusting a voltage amplitude of the RF signal supplied to at least one of the optical modulation parts, monitoring means 21 for monitoring the intensity $P_{out}$ of the output light beam, and a bias control circuit 20 that controls the amplitude adjusting means to change a difference in voltage amplitude between the RF signals supplied to each optical modulation part, that detects a variation of the output light beam corresponding to the variation of the difference in voltage amplitude from the output signal of the monitoring means, and that controls the phase regulator on the basis of the detection result to adjust the phase difference.

6 Claims, 4 Drawing Sheets (51) Int. Cl.
*G02F 1/01* (2006.01)
*H04B 10/50* (2013.01)
*G02F 1/225* (2006.01)
*G02F 1/21* (2006.01)

(52) U.S. Cl.
CPC .... *H04B10/50575* (2013.01); *H04B 10/50577* (2013.01); *G02F 1/2255* (2013.01); *G02F 2001/212* (2013.01); *G02F 2203/56* (2013.01)

(56) References Cited

U.S. PATENT DOCUMENTS

2008/0094123 A1* 4/2008 Koh et al. .................... 327/513
2008/0187324 A1 8/2008 Akiyama et al.
2009/0310900 A1 12/2009 Sakamoto et al.
2011/0097029 A1 4/2011 Sakamoto et al.

* cited by examiner

OPTICAL FREQUENCY COMB GENERATING DEVICE AND OPTICAL PULSE GENERATING DEVICE USING SAME, AND OPTICAL FREQUENCY COMB GENERATING METHOD AND OPTICAL PULSE GENERATING METHOD USING SAME

TECHNICAL FIELD

The present invention relates to an optical frequency comb generating device and an optical pulse generating device using the same, and an optical frequency comb generating method and an optical pulse generating method using the same, and more particularly, to an optical frequency comb generating device which employs an optical modulator including two optical modulation parts that independently modulate optical waves propagating in two branch waveguides of a Mach-Zehnder type optical waveguide and a phase regulator that controls a phase difference between the optical waves propagating in the two branch waveguides, an optical pulse generating device employing the optical frequency comb generating device, an optical frequency comb generating method using the optical modulator, and an optical pulse generating method using the optical frequency comb generating method.

BACKGROUND ART

An optical frequency comb generating method of simultaneously generating plural optical frequency components having a frequency difference of an equal interval has attracted attention. This technique is used for a wavelength multiplexing light source of an optical wavelength division multiplexing communication system or a short-pulse light source for ultrafast transmission or optical measurement.

As disclosed in PTL 1, an optical frequency comb generating device has been proposed which employs a so-called dual-driven Mach-Zehnder type optical modulator that independently modulates optical waves propagating in two branch waveguides of a Mach-Zehnder type optical waveguide.

PTL 1 discloses a method of providing a flat power spectrum characteristic or a linear chirp characteristic using the optimal frequency distribution intensity of an optical frequency comb. It is described therein that it is necessary to satisfy a first condition expressed by Expression 1.

Expression 1

$$\Delta A + \Delta \theta = \pi \qquad (1)$$

When the condition of Expression 1 is satisfied, the power spectrum is flat and the chirp is almost linear. Here, $\Delta A \equiv A_1 - A_2$ and $\Delta \theta \equiv \theta_1 - \theta_2$ are defined, $A_1$ and $A_2$ represent degrees of modulation in the branch waveguides, and $\theta_1$ and $\theta_2$ represent phase leads due to the optical path length or the bias control in the branch waveguides.

When a second condition of Expression 2 is satisfied, the comb signal conversion efficiency is maximum and the output/input ratio η in optical power is 0.5. Since Expression 2 is included in the condition of Expression 1, Expression 2 is the optimal drive condition.

Expression 2

$$\Delta A = \Delta \theta = \frac{\pi}{2} \qquad (2)$$

Figure 1:
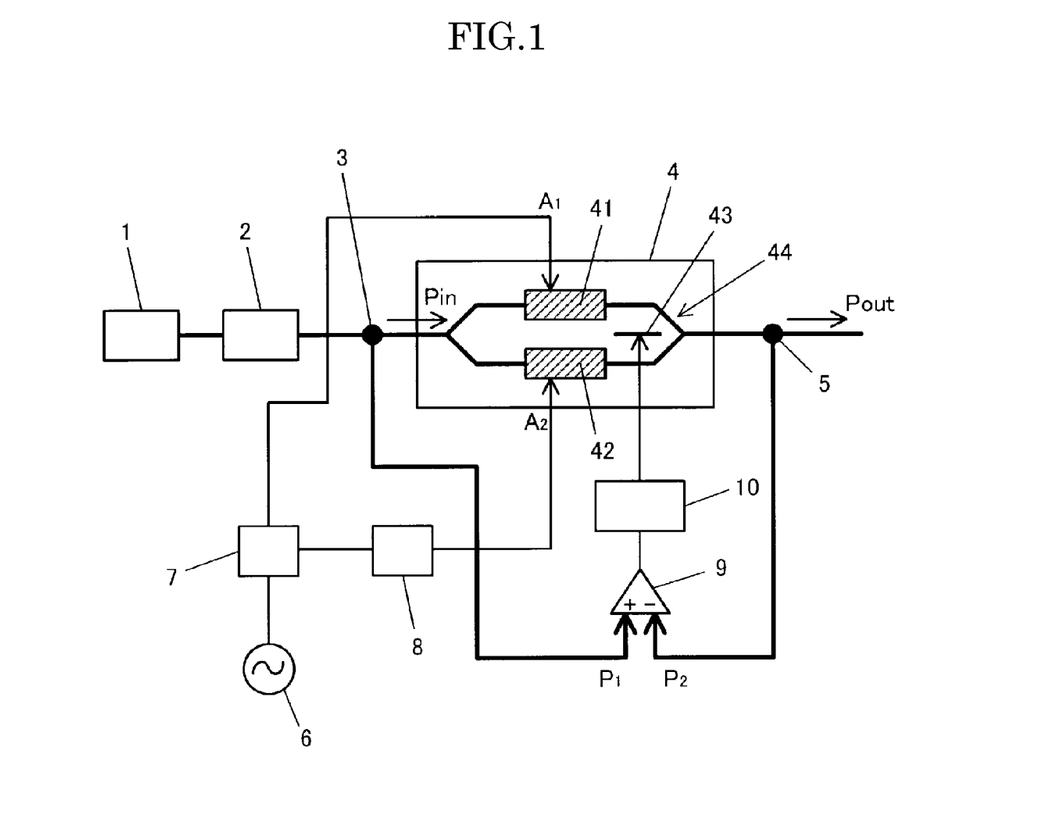
FIG. 1 is diagram schematically illustrating an optical frequency comb generating device according to the related art.

A drive condition control method of causing the drive condition of an optical modulator to stably satisfy Expression 2 over a long period is disclosed in NPL 1. FIG. 1 is diagram schematically illustrating the control method disclosed in NPL 1.

An optical modulator 4 is provided with a Mach-Zehnder type optical waveguide 44, and two branch waveguides are provided with optical modulation parts 41 and 42 that can be independently driven, respectively. A phase regulator 43 is disposed as means for regulating a phase difference between optical waves propagating in the two branch waveguides.

An optical wave which is emitted from a continuum light source 1 such as a semiconductor laser light source and of which the polarization plane is adjusted by the use of a polarization controller 2 is input to the optical modulator 4. An RF signal supplied from an RF signal source 6 is divided into two RF signals by a distributor 7 and the divided RF signals are supplied to the modulation parts of the optical modulator. The signal intensity of one RF signal is adjusted through the use of an attenuator 8 and the adjusted RF signal is supplied to the optical modulator part.

In this method, four parameters of a degree of modulation $A_1$ of a first drive signal, a degree of modulation $A_2$ of a second drive signal, power $P_{in}$ of a light beam input to the optical modulator, and power $P_{out}$ of a light beam output from the optical modulator are monitored, and a DC bias to be supplied to the phase regulator 43 is controlled by the use of a bias control circuit 10 so as to satisfy Expressions 3 and 4. In FIG. 1, in order to monitor the ratio of the power $P_{in}$ of an input light beam and the power $P_{out}$ of an output light beam, some optical waves are extracted by the use of optical couplers 3 and 5 disposed in the waveguides and are input to a balanced light-receiving element 9. In order to monitor the degrees of modulation $A_1$ and $A_2$, a circuit (not shown) detecting the intensity of the RF signals supplied to the optical modulation parts is provided.

Expression 3

$$\Delta A = A_1 - A_2 = \frac{\pi}{2} \qquad (3)$$

Expression 4

$$\eta = \frac{P_{out}}{P_{in}} = 0.5 \qquad (4)$$

In this way, in the method disclosed in NPL 1, it is necessary to monitor four parameters shown in Expressions 3 and 4 in order to control the drive condition. However, in order to know the four parameters, a part of two RF powers input to the MZ modulator, a part of optical power input to the MZ modulator, and a part of optical power output from the MZ modulator are actually monitored as shown in FIG. 1. Accordingly, it is necessary to previously obtain the relationship between the actually-monitored parameters and four parameters corresponding thereto in a one-to-one manner, that is, calibration is necessary.

The relationship between the power and the degrees of modulation ($A_1$ and $A_2$) of RF signals to be monitored can be very accurately obtained at a relatively low cost and does not present any particular difficulty. However, since there is an excessive loss due to the internal structure of the optical modulator and a coupling structure associated with input and output of a light beam, it is difficult to accurately calculate the input optical power ($P_{in}$) and the output optical power ($P_{out}$).

For example, PTL 2 discloses a method of obtaining a degree of modulation by measuring plural sideband peak intensity using a light spectrum analyzer. On each side of dual drive, the actual drive condition (modulation frequency and power) can be calibrated by obtaining the degree of modulation and the monitored RF power at a certain point. Since the degree of modulation can be directly measured using only the light spectrum analyzer without changing the wiring and configuration of the device, it is possible to very accurately obtain the relationship between the RF power and the degree of modulation.

The power ratio $\eta=0.5$ of the input and output light beams to be controlled is not a singular point. Accordingly, when there is an error in the calibration performed for the first time, the error is not ascertained and remains as an error, thereby causing degradation in signal quality.

In another calibration method, the optimal drive condition can be obtained from the temporal waveform of an output light beam and the power ratio of monitored light beams associated with the input and output at that time can be controlled to a target control value. However, when it is driven at ultrahigh frequencies of 10 GHz or higher, there is a problem in that a high-cost measuring instrument is necessary for calibration. When the calibration can be accurately performed, but an excessive loss in the modulator varies over a long period and thus the optimal control point varies, the related art has a problem in that the variation of the optimal control point is not recognized in the control method and thus the degradation of signals is not recognized.

CITATION LIST

Patent Literature

[PTL 1] JP-A-2007-248660
[PTL 2] JP-A-2009-229926

Non-Patent Literature

[NPL 1] T. Sakamoto, I. Morohashi, T. Kawanishi, "Mach-Zehnder-modulator-based flat comb generator with auto bias control", Microwave Photonics, 2008. Jointly held with the 2008 Asia-Pacific Microwave Photonics Conference (MWP/APMP 2008)

SUMMARY OF INVENTION

Technical Problem

The invention is made to solve the above-mentioned problems and an object thereof is to provide an optical frequency comb generating device which can accurately control the drive condition of an optical frequency comb, which has a simple control configuration, and which is manufactured at a low cost, an optical pulse generating device employing the optical frequency comb generating device, an optical frequency comb generating method, and an optical pulse generating method using the optical frequency comb generating method.

Solution to Problem

In order to achieve the above-mentioned object, according to a first aspect of the invention, there is provided an optical frequency comb generating device that has a substrate having an electro-optical effect, a Mach-Zehnder type optical waveguide formed on the substrate, two optical modulation parts independently modulating optical waves propagating in two branch waveguides of the Mach-Zehnder type optical waveguide, and a phase regulator controlling a phase difference between the optical waves propagating in the two branch waveguides and in which a continuous light beam is input to the Mach-Zehnder type optical waveguide, RF signals are supplied to the two optical modulation parts, and an output light beam as an optical frequency comb is output from the Mach-Zehnder type waveguide, including: amplitude adjusting means for adjusting a voltage amplitude of the RF signal supplied to at least one of the optical modulation parts; monitoring means for monitoring intensity of the output light beam; and a bias control circuit that controls the amplitude adjusting means to change a difference in voltage amplitude between the RF signals supplied to each optical modulation part, that detects a variation of the output light beam corresponding to the variation of the difference in voltage amplitude from an output signal of the monitoring means, and that controls the phase regulator on the basis of the detection result to adjust the phase difference.

According to a second aspect of the invention, there is provided an optical pulse generating device including: the optical frequency comb generating device according to the first aspect; and a dispersion compensator that receives an output light beam output from the optical frequency comb generating device and that controls phase and intensity of each frequency component of the output light beam.

According to a third aspect of the invention, there is provided an optical frequency comb generating method using an optical frequency comb generating device that has a substrate having an electro-optical effect, a Mach-Zehnder type optical waveguide formed on the substrate, two optical modulation parts independently modulating optical waves propagating in two branch waveguides of the Mach-Zehnder type optical waveguide, and a phase regulator controlling a phase difference between the optical waves propagating in the two branch waveguides and in which a continuous light beam is input to the Mach-Zehnder type optical waveguide, RF signals are supplied to the two optical modulation parts, and an output light beam as an optical frequency comb is output from the Mach-Zehnder type waveguide, the optical frequency comb generating method including: an amplitude adjusting and output light beam monitoring step of adjusting a voltage amplitude of the RF signal supplied to at least one of the optical modulation parts and monitoring the intensity of the output light beam thereof; and a bias control step of controlling the phase regulator so that the intensity variation of the output light beam in the amplitude adjusting and output light beam monitoring step is a specified value.

A fourth aspect of the invention provides the optical frequency comb generating method according to the third aspect, wherein the specified value is a minimum value.

According to a fifth aspect of the invention, there is provided an optical pulse generating method including: an optical pulse step of controlling phase and intensity of each frequency component of an output light beam generated through the optical frequency comb generating method according to the third or fourth aspect so as to shape the output light beam in a predetermined optical pulse shape.

Advantageous Effects of Invention

According to the first aspect of the invention, the optical frequency comb generating device that has a substrate having an electro-optical effect, a Mach-Zehnder type optical waveguide formed on the substrate, two optical modulation parts independently modulating optical waves propagating in two branch waveguides of the Mach-Zehnder type optical waveguide, and a phase regulator controlling a phase difference between the optical waves propagating in the two branch waveguides and in which a continuous light beam is input to the Mach-Zehnder type optical waveguide, RF signals are supplied to the two optical modulation parts, and an output light beam as an optical frequency comb is output from the Mach-Zehnder type waveguide includes: amplitude adjusting means for adjusting a voltage amplitude of the RF signal supplied to at least one of the optical modulation parts; monitoring means for monitoring intensity of the output light beam; and a bias control circuit that controls the amplitude adjusting means to change a difference in voltage amplitude between the RF signals supplied to each optical modulation part, that detects a variation of the output light beam corresponding to the variation of the difference in voltage amplitude from an output signal of the monitoring means, and that controls the phase regulator on the basis of the detection result to adjust the phase difference. Accordingly, it is not necessary to perform calibration necessary for drive control according to the related art and it is possible to perform more accurate drive control. Since only the variation of the output light beam is monitored, it is possible to suppress complication of the overall device or an increase in cost.

According to the second aspect of the invention, since the optical pulse generating device includes: the optical frequency comb generating device according to the first aspect; and a dispersion compensator that receives an output light beam output from the optical frequency comb generating device and that controls phase and intensity of each frequency component of the output light beam, it is possible to use the optical frequency comb which is controlled with high accuracy by the optical frequency comb generating device according to the first aspect. Accordingly, it is possible to provide an optical pulse generating device which can control the waveform of an optical pulse with higher accuracy.

According to the third aspect of the invention, the optical frequency comb generating method using an optical frequency comb generating device that has a substrate having an electro-optical effect, a Mach-Zehnder type optical waveguide formed on the substrate, two optical modulation parts independently modulating optical waves propagating in two branch waveguides of the Mach-Zehnder type optical waveguide, and a phase regulator controlling a phase difference between the optical waves propagating in the two branch waveguides and in which a continuous light beam is input to the Mach-Zehnder type optical waveguide, RF signals are supplied to the two optical modulation parts, and an output light beam as an optical frequency comb is output from the Mach-Zehnder type waveguide includes: an amplitude adjusting and output light beam monitoring step of adjusting a voltage amplitude of the RF signal supplied to at least one of the optical modulation parts and monitoring the intensity of the output light beam thereof; and a bias control step of controlling the phase regulator so that the intensity variation of the output light beam in the amplitude adjusting and output light beam monitoring step is a specified value. Accordingly, it is possible to easily obtain an optical frequency comb satisfying the condition of Expression 1. In this way, it is possible to perform drive control with high accuracy using a simple method.

According to the fourth aspect of the invention, since the specified value in the optical frequency comb generating method according to the third aspect is a minimum value, it is possible to easily obtain an optical frequency comb satisfying the optimal condition of Expression 2.

According to the fifth aspect of the invention, since the optical pulse generating method includes: an optical pulse step of controlling phase and intensity of each frequency component of an output light beam generated through the optical frequency comb generating method according to the third or fourth aspect so as to shape the output light beam in a predetermined optical pulse shape, it is possible to easily obtain a highly-accurate optical pulse using the optical frequency comb which is controlled with high accuracy through the optical frequency comb generating method according to the second or fourth aspect.

DESCRIPTION OF EMBODIMENTS

Figure 2:
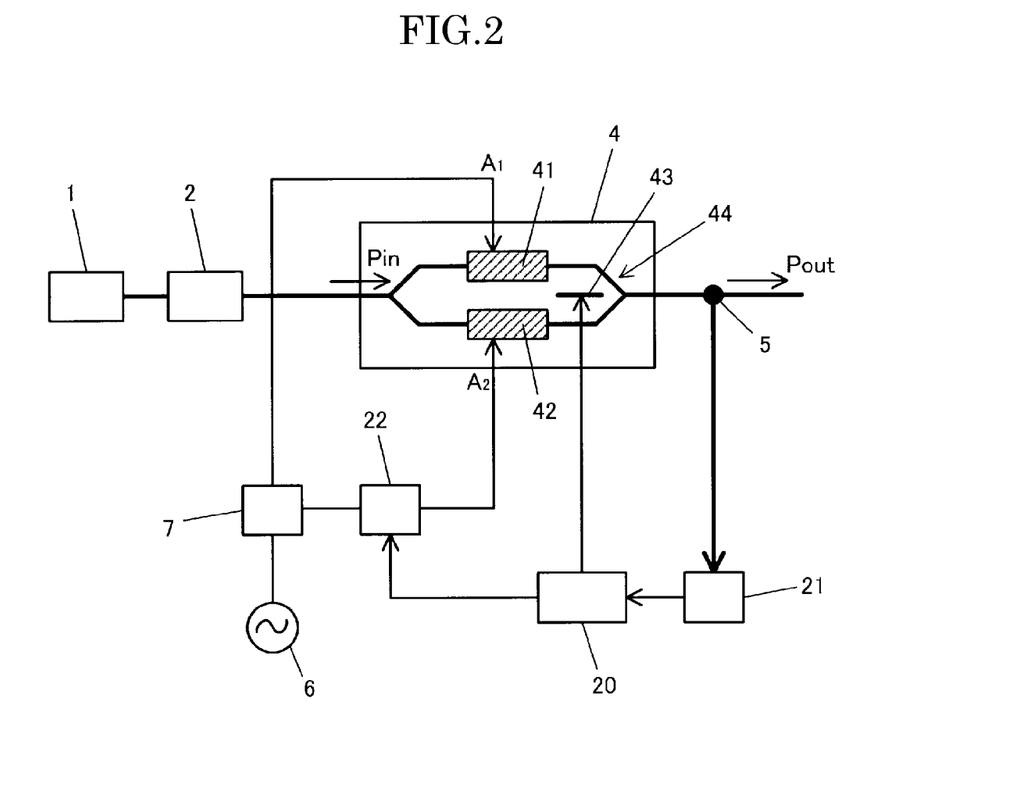
FIG. 2 is diagram schematically illustrating an optical frequency comb generating device according to the invention.

An optical frequency comb generating device, an optical pulse generating device using the optical frequency comb generating device, an optical frequency comb generating method, and an optical pulse generating method using the optical frequency comb generating method according to the invention will be described below in detail. In FIG. 2, the same reference numerals as in FIG. 1 represent the same members.

One feature of the invention is to employ a control method for which calibration, which is a problem in the control method according to the related art, is not required and which does not depend on the absolute value of optical power to be monitored.

As shown in FIG. 2, an optical frequency comb generating device according to the invention includes a substrate having an electro-optical effect, a Mach-Zehnder type optical waveguide 44 formed on the substrate, two optical modulation parts 41 and 42 independently modulating optical waves propagating in two branch waveguides of the Mach-Zehnder type optical waveguide, and a phase regulator 43 controlling a phase difference between the optical waves propagating in the two branch waveguides. Here, a continuous light beam ($P_{in}$) is input to the Mach-Zehnder type optical waveguide, RF signals (RF signal source 6) are supplied to the two optical modulation parts, and an output light beam ($P_{out}$) as an optical frequency comb is output from the Mach-Zehnder type waveguide.

The optical modulator constituting the optical frequency comb generating device according to the invention can be manufactured using techniques known to the corresponding technical field. Substrates formed of lithium niobate, lithium tantalate, PLZT (Lead Lanthanum Zirconate Titanate), quartz-based materials, or combinations thereof can be used as the substrate formed of a material having an electro-optical effect. Particularly, lithium niobate (LN) crystal having a high electro-optical effect can be suitably used.

An optical waveguide can be formed on the substrate by diffusing Ti or the like into the surface of the substrate through the use of a thermal diffusion method or a proton exchange method. A ridge-shaped waveguide may be used in which a part of the substrate corresponding to the optical waveguide is made to be convex by etching apart of the substrate other than the optical waveguide, forming grooves on both sides of the optical waveguide, or the like.

In the optical modulation parts 41 and 42 or the phase regulator 43 of the optical modulator, modulation electrodes such as a signal electrode and a ground electrode are formed on the substrate. Such electrodes can be formed through the use of formation of Ti and Au electrode patterns, gold plating, or the like. A dielectric buffer layer of $SiO_2$ or the like may be formed on the surface of the substrate in which the optical waveguide has been formed if necessary and the modulation electrodes may be formed on the buffer layer.

The temporal waveform of the output of a dual-driven Mach-Zehnder type optical modulator is given as Expression 5.

Expression 5

$$E_{out} = \qquad\qquad\qquad\qquad\qquad\qquad\qquad\qquad (5)$$
$$\frac{1}{2}E_{in}[\sin(\omega_0 t + A_1 \sin \omega_m t + \theta_1) + \sin(\omega_n t + A_2 \sin \omega_m t + \theta_2)] =$$
$$E_{in} \cos\left(\frac{\Delta A}{2}\sin \omega_m t + \frac{\Delta\theta}{2}\right)\sin(\omega_0 t + \overline{A} \sin \omega_m t + \overline{\theta})$$
$$\text{where } \overline{A} = \frac{A_1 + A_2}{2}, \overline{\theta} = \frac{\theta_1 + \theta_2}{2}$$

In Expression 5, $E_{in}$ and $\omega_0$ represent the electric field intensity and the optical frequency of an input light beam, respectively. Accordingly, the output optical power $P_{out}$ is expressed as Expression 6 and the temporal average $P_{ave}$ of the output optical power is expressed as Expression 7.

Expression 6

$$P_{out} = \frac{1}{2}P_{in}\{1 + \cos(\Delta A \sin\omega_m t + \Delta\theta)\} \qquad (6)$$

Expression 7

$$P_{ave} = \frac{P_{in}}{2}\frac{\omega_m}{2\pi}\int_{-\frac{\pi}{\omega_m}}^{+\frac{\pi}{\omega_m}}[1 + \cos(\Delta A \sin\omega_m t + \Delta\theta)]\,dt = \qquad (7)$$
$$\frac{P_{in}}{2}\{1 + \cos(\Delta\theta)J_0(\Delta A)\}$$

Figure 3:
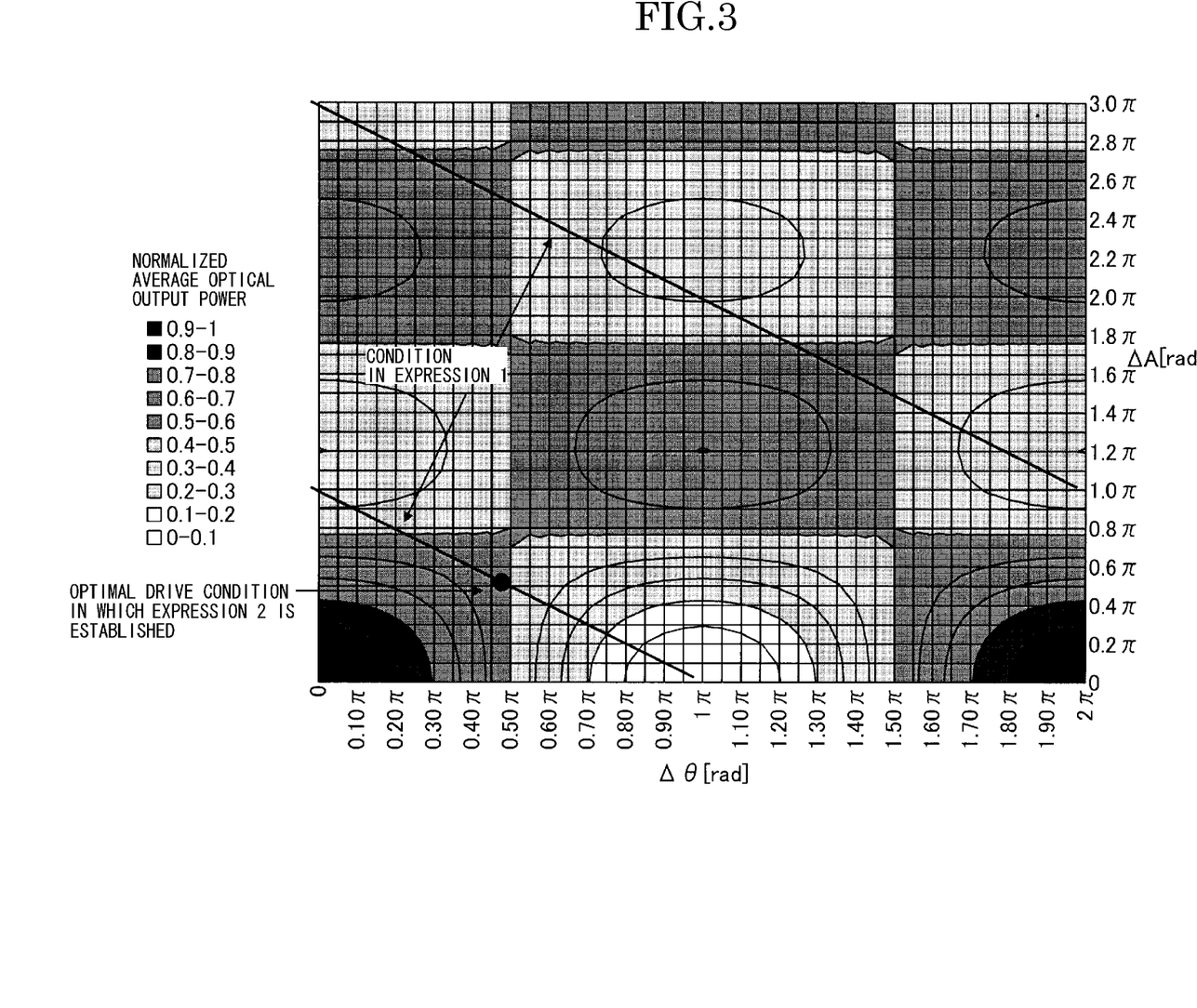
FIG. 3 is a graph illustrating dependency of output optical power (temporal average) on $\Delta\theta$ and $\Delta A$.

When $P_{ave}/P_{in}$ is plotted with $\Delta\theta$ and $\Delta A$ as parameters in Expression 7, the graph shown in FIG. 3 is obtained. Accordingly, since the condition for establishing Expression 2 is not a singular point as a maximum value or a minimum value, it can be seen that it is not possible to check the optimal control point even when the optical control point is shifted due to a variation in loss or the like.

With $\Delta\theta = \pi/2$ which is the condition of Expression 2, it can be seen that the second term of Expression 7 is 0 and $P_{ave}$ is constant regardless of $\Delta A$. That is, even when the amplitude of the RF signal supplied to one optical modulation part shown in FIG. 2 is changed and thus $\Delta A$ is changed, the power of the output light beam is not changed.

Therefore, by changing the value of $\Delta A$, monitoring the power variation of the output light beam, and adjusting $\Delta\theta$ so that the variation is a minimum, it is possible to set the optical modulator to the optical condition of $\Delta\theta = \pi/2$.

As shown in FIG. 2, the optical frequency comb generating device according to the invention includes amplitude adjusting means 22 for adjusting a voltage amplitude of the RF signal supplied to at least one of the optical modulation parts, monitoring means 21 for monitoring the intensity of the output light beam $P_{Out}$ from the optical modulator, and a bias control circuit 20 that controls the amplitude adjusting means to change a difference in voltage amplitude between the RF signals supplied to the optical modulation parts, that detects a variation of the output light beam corresponding to the variation of the difference in voltage amplitude from the output signal of the monitoring means, and that controls the phase regulator 43 on the basis of the detection result to adjust the phase difference.

An amplitude-variable amplifier or an attenuator can be used as the amplitude adjusting means 22. Since an amplitude varying mechanism has only to be able to operate at such a low frequency to follow the light-receiving element 21 of the monitoring means, an electrical or mechanical mechanism can be used.

As a drive control method of the optical frequency comb generating device, the bias control circuit 20 shown in FIG. 2 performs the bias adjusting process in the following order.

(1) The voltage amplitude of the RF signal supplied to one optical modulation part 42 is adjusted by controlling the amplitude adjusting means 22 and the intensity $P_{out}$ of the output light beam from the optical modulator is monitored (amplitude adjusting and output light beam monitoring step).

(2) the bias voltage supplied to the phase regulator 43 is controlled so that the intensity variation of the output light beam in the "amplitude adjusting and output light beam monitoring step" of (1) is a specified value (bias control step).

(3) By setting the specified value to be a minimum variation value in the "bias control step" of (2), it is possible to easily obtain the optical frequency comb satisfying the optimal condition of $\Delta\theta = \pi/2$.

The optical frequency comb generating device according to the invention may be additionally provided with means for monitoring the RF signals supplied to the optical modulation parts 41 and 42 in order to detect $\Delta A$.

Figure 4:
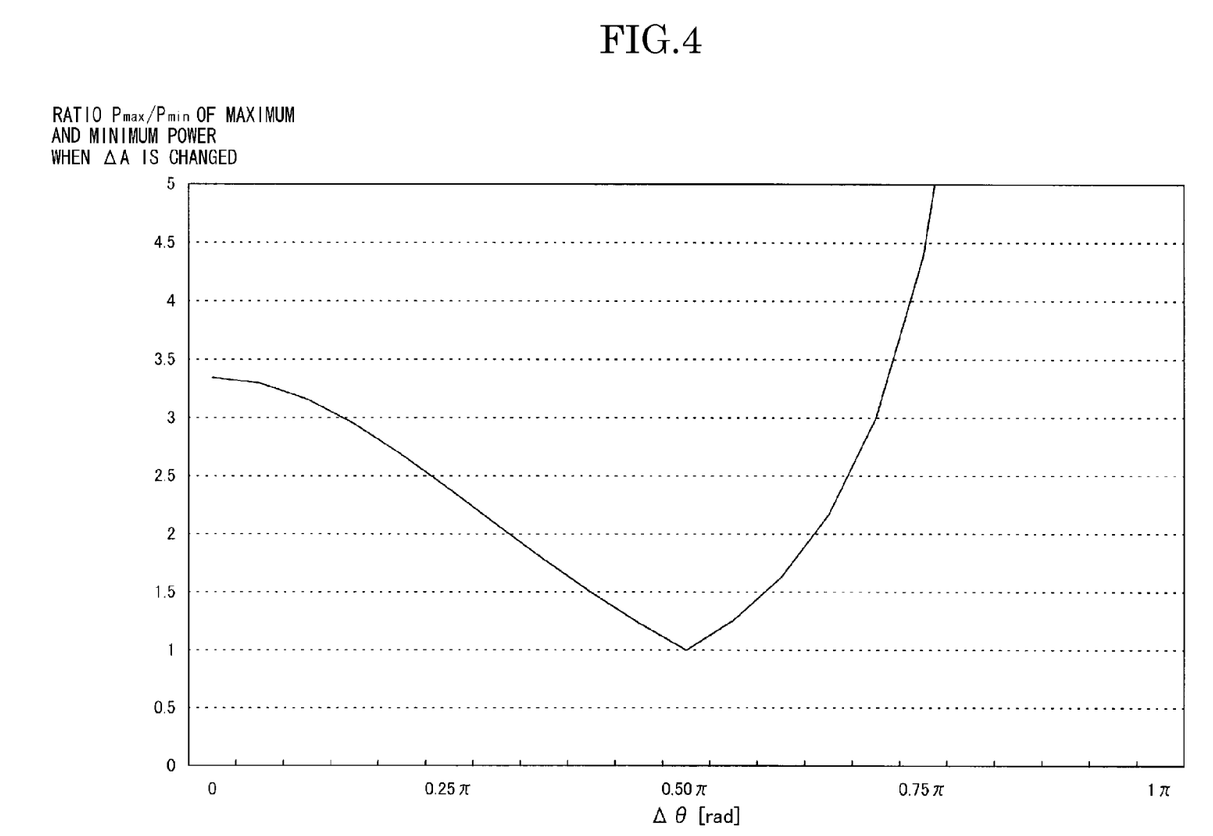
FIG. 4 is a graph illustrating a variation of the output optical power when $\Delta A$ is changed.

In Expression 7, when $\Delta A$ at each point of $\Delta\theta$ is changed in the range of 0 to $1.2\pi$ even with $\Delta\theta \neq \pi/2$, the power variation of the output light beam shown in FIG. 4 occurs. From this graph, by setting the ratio of the maximum value and the minimum value of the intensity of the output light beam when changing $\Delta A$ so as to be any value of the vertical axis in the graph shown in FIG. 4 by the use of the specified value in the "bias control step" of (2), it is possible to adjust the value of $\Delta\theta$ to satisfy the condition.

Particularly, in the optical frequency comb, the values of $\Delta\theta$ and $\Delta A$ are both used in the vicinity of $\pi/2$. Accordingly, as shown in FIG. 4, since the power variation of an output light beam substantially linearly follows $\Delta\theta$ in the vicinity of $\pi/2$, it is possible to easily set $\Delta\theta$ by controlling $\Delta A$ to be a value with which the ratio of the maximum value and the minimum value of the intensity of the output light beam.

As described above, by setting $\Delta\theta$ to the optimal drive condition or a predetermined condition and then setting $\Delta A$ to a necessary value, it is possible to easily perform adjustment of, for example, flattening the frequency intensity distribution of the optical frequency comb. By monitoring the RF signals or the like, it is also possible to control $\Delta A$ with high precision.

In the optical modulator using an LN substrate which is a substrate having an electro-optical effect, a DC drift phenomenon occurs. Accordingly, the control of a bias point is absolutely necessary for stabilizing the operation over a long period of time. In a typical optical modulator for optical communication, it is possible to easily optimize the bias point by adding a low-frequency signal to the bias voltage and monitoring the optical output corresponding to the low frequency. However, when the optical modulator is used for the optical frequency comb generating device, the bias point is not apparent through the monitoring of the output optical power and thus such a bias control method cannot be used. Accordingly, by employing the optical frequency comb generating device or the optical frequency comb generating method according to the invention, the monitoring of the optical power should be performed at two positions for an input light beam and an output light beam, but can be performed at only one position for an output light beam, and the calibration which is essential in the related art is not necessary. When the characteristics of the optical modulator are changed like an increase in optical loss, this situation could not be controlled in the related art. However, even when the characteristics are changed in the meantime, a drive control can be performed in the invention.

In the invention, by employing the optical frequency comb generating device and providing a dispersion compensator that receives the output light beam output from the optical frequency comb generating device and that controls the phase and intensity of the frequency components of the output light beam, an optical pulse generating device can be implemented. Accordingly, since the optical frequency comb of which the drive is controlled with high precision by the optical frequency comb generating device is used, it is possible to provide an optical pulse generating device of which the waveform of an optical pulse is controlled with higher precision.

By employing the above-mentioned optical frequency comb generating method and adding an optical pulse step of controlling the phase and intensity of each frequency component-of an output light beam generated through the optical frequency comb generating method so as to shape the output light beam in a predetermined optical pulse shape, it is possible to provide an optical pulse generating method which can control a pulse waveform with high precision.

INDUSTRIAL APPLICABILITY

As described above, according to the invention, it is possible to provide an optical frequency comb generating device which can accurately control the drive condition of an optical frequency comb, which has a simple control configuration, and which is manufactured at a low cost, an optical pulse generating device employing the optical frequency comb generating device, an optical frequency comb generating method, and an optical pulse generating method using the optical frequency comb generating method.

REFERENCE SIGNS LIST

1: CONTINUUM LIGHT SOURCE
2: POLARIZATION CONTROLLER
4: OPTICAL MODULATOR
5: OPTICAL COUPLER
6: RF SIGNAL SOURCE
7: DISTRIBUTOR
20: BIAS CONTROL CIRCUIT
21: MONITORING MEANS
22: AMPLITUDE ADJUSTING MEANS
41, 42: OPTICAL MODULATION PART
43: PHASE REGULATOR

The invention claimed is:
1. An optical frequency comb generating device having a substrate having an electro-optical effect, a Mach-Zehnder type optical waveguide formed on the substrate, two optical modulation parts independently modulating optical waves propagating in two branch waveguides of the Mach-Zehnder type optical waveguide, and a phase regulator controlling a phase difference between the optical waves propagating in the two branch waveguides and in which a continuous light beam is input to the Mach-Zehnder type optical waveguide, RF signals are supplied to the two optical modulation parts, and an output light beam as an optical frequency comb is output from the Mach-Zehnder type waveguide, comprising:
  amplitude adjusting means for adjusting a voltage amplitude of an RF signal supplied to at least one of the optical modulation parts;
  monitoring means for monitoring the average intensity of the output light beam and outputting an output signal; and
  a bias control circuit that controls the amplitude adjusting means to change a difference in voltage amplitude between the RF signals supplied to each optical modulation part, that detects a variation of the output light beam corresponding to the variation of the difference in voltage amplitude from the output signal of the monitoring means, and that controls the phase regulator on the basis of the detection result to adjust the phase difference.

2. An optical pulse generating device comprising:
  the optical frequency comb generating device according to claim 1; and
  a dispersion compensator that receives an output light beam output from the optical frequency comb generating device and that controls phase and intensity of each frequency component of the output light beam.

3. An optical frequency comb generating method using an optical frequency comb generating device having a substrate having an electro-optical effect, a Mach-Zehnder type optical waveguide formed on the substrate, two optical modulation parts independently modulating optical waves propagating in two branch waveguides of the Mach-Zehnder type optical waveguide, and a phase regulator controlling a phase difference between the optical waves propagating in the two branch waveguides and in which a continuous light beam is input to the Mach-Zehnder type optical waveguide, RF signals are supplied to the two optical modulation parts, and an output light beam as an optical frequency comb is output from the Mach-Zehnder type waveguide, the optical frequency comb generating method comprising:
  an amplitude adjusting and output light beam monitoring step of adjusting a voltage amplitude of an RF signal supplied to at least one of the optical modulation parts and monitoring the average intensity of the output light beam thereof and outputting an output signal; and
  a bias control step of controlling the phase regulator so that the intensity variation of the output light beam in the amplitude adjusting and output light beam monitoring step is a specified value.

4. The optical frequency comb generating method according to claim 3, wherein the specified value is a minimum value.

5. An optical pulse generating method comprising:
  an optical pulse step of controlling phase and intensity of each frequency component of an output light beam generated through the optical frequency comb generating method according to claim 3, so as to shape the output light beam in a predetermined optical pulse shape.

6. An optical pulse generating method comprising:
  an optical pulse step of controlling phase and intensity of each frequency component of an output light beam generated through the optical frequency comb generating method according to claim 4, so as to shape the output light beam in a predetermined optical pulse shape.

* * * * *